United States Patent [19]

Schuette

[11] Patent Number: 4,801,490
[45] Date of Patent: Jan. 31, 1989

[54] METHOD AND APPARATUS FOR SAND BLASTING A DESIGN ON GLASS

[76] Inventor: James R. Schuette, 601 Homeworth Rd., Alliance, Ohio 44601

[21] Appl. No.: 860,419

[22] Filed: May 7, 1986

[51] Int. Cl.$^4$ .......................... B24C 1/00; B32B 3/00; B32B 7/00
[52] U.S. Cl. .................................. 428/211; 51/262 R; 51/310; 51/311; 51/312; 427/258; 427/288; 428/343; 428/354
[58] Field of Search ...................... 51/262 R, 310, 311, 51/312; 428/41, 154, 351, 343, 354; 427/258, 288

[56] References Cited

U.S. PATENT DOCUMENTS

| | | | |
|---|---|---|---|
| 174,167 | 7/1875 | Tilghman | 51/311 |
| 1,594,603 | 10/1924 | Chase | 51/311 |
| 1,720,567 | 7/1929 | Phillip | 51/312 |
| 3,267,621 | 8/1966 | Meyers | 51/312 |
| 3,425,968 | 2/1969 | Reiling | 524/21 |
| 3,473,941 | 10/1969 | Hemphill | 428/141 |
| 3,507,740 | 4/1970 | Gaspari | 428/41 |
| 3,515,528 | 6/1970 | Luther | 51/310 |
| 3,579,926 | 8/1978 | Gaspari | 51/311 X |
| 4,133,919 | 1/1979 | Parsons | 427/259 |
| 4,430,416 | 2/1984 | Goto | 430/263 |
| 4,587,186 | 5/1986 | Nakamura et al. | 51/311 X |

OTHER PUBLICATIONS

Brown-Bridge Brochure-Pancake Dry Gummed Label Paper (1984).
Brown-Bridge Brochure-Dry Gum Label Papers (1985).
Brown-Bridge "Brochure Guide to the Properties, Uses and Advantages of Brown-Bridge Water Sensitive Adhesive Coated Products", (1986).

*Primary Examiner*—William J. Van Balen
*Attorney, Agent, or Firm*—Bacon & Thomas

[57] ABSTRACT

A stencil is provided which is useful for sandblasting a design on a glass substrate. The stencil comprises a paper sheet having a particular adhesive coated on one side and a pattern made from a sandblasting resist material coated onto the other side. The stencil is self-adhesive. In addition, the stencil provides adequate amounts of adhesive in a form which allows good adhesion to a glass substrate without being present in an amount which would interfere with the sandblasting process. The adhesive is deposited onto the paper sheet from a suspension of liquid gum particles which results in an adhesive layer having a multiplicity of discrete gum particles adhered to the paper and to each other at their points of contact. The stencil is used in a sandblasting process wherein the stencil is adhered to the glass by wetting the adhesive and then the stencil/glass assembly is sandblasted to erode the areas of the glass which underlie the portion of the stencil which is not protected by the resist layer. Thereafter, the stencil is easily removed by washing in hot water.

14 Claims, 1 Drawing Sheet

METHOD AND APPARATUS FOR SAND BLASTING A DESIGN ON GLASS

BACKGROUND OF THE INVENTION

1. Field of the Invention

This invention pertains to the art of producing decorative designs on glass and similar substrates by means of a sand blasting technique. The invention is more particularly directed toward a method of sandblasting intricate designs on glass or the like and an article of manufacture which is useful for carrying out the method.

2. Description of Related Art

A useful method of providing permanent decorative designs on various types of glass articles such as windows, drinking glasses, mirrors, etc., usually involves sandblasting designated portions of the glass surface to erode those portions while leaving the remaining portions untouched by the sandblast. The sandblasting erodes the glass to produce a cut-away area which has a "frosted" appearance. The frosted appearance of the eroded portion provides an effective contrast for the untouched smooth transparent portion of the glass. By carefully controlling the areas which are sandblasted, a contrasting array of eroded and smooth areas can be produced on the glass in the form of a picture, artistic design, lettering, etc.

In order to produce adequate contrast, it is important to provide a sharp cut-off between the eroded areas and the smooth non-eroded areas. By providing a sharp cut-off, the design will have good definition. In the past, various types of stencils have been proposed for this purpose. Typically, these stencils shield or mask the areas which are to be left smooth and allow the sandblast to erode the unshielded areas.

One type of stencil is disclosed in U.S. Pat. No. 174,167. The stencil described in this patent comprises a sheet of pulverizable paper with an ink resist design adhered to one side thereof. In order to apply the stencil to the glass, it is first necessary to apply a layer of liquid paste onto the glass surface in a separate manual operator step before applying the stencil to the glass. The stencil itself lacks adhesive. The paste is a solution of dextrin in an aqueous solution containing a little ammonia. This separate step of applying the paste solution to the glass is difficult for an operator to accomplish in an acceptable manner because the thickness of the paste on the glass must be uniform and very thin so that it does not interfere with the sandblasting. It has not been possible with this method to apply sufficient paste to assure adhesion while at the same time not interfering with the sandblasting process. In addition, the operation of applying liquid paste to the glass is a messy operation and very time consuming.

U.S. Pat. No. 1,594,603 discloses a method of sandblasting an ornamental design on stone or similar substrates. The method uses a sheet of soft packing material, such as blotting paper, which is held in place on the stone directly underneath a stencil. The stencil and packing material are utilized as separate elements which is inconvenient and requires additional operator steps to individually place and secure the stencil and the packing material onto the stone surface. Furthermore, the method of securing these materials to the stone involves the use of clamps and there is no suggestion to use paste to secure the stencil and packing material onto the stone. The prior art use of paste is not suggested and, thus, appears to be abandoned in favor of the clamps for securing the stencil and packing material to the stone. While the use of clamps and the like will avoid the inherent problems with respect to the application of liquid paste onto the glass, it creates other difficulties which makes the method described in U.S. Pat. No. 1,594,603 especially undesirable for producing designs on glass. For example, the clamps are clumsy and expensive and their use also requires additional operator steps which makes the overall process inefficient.

Finally, in U.S. Pat. No. 3,267,621, a process is described for sandblasting a decorative design on a glass article. In this process the problems associated with the prior art methods are said to be solved by directly applying a resist layer onto the glass in the form of a design by means of a silkscreening process. No paper substrate is used since the resist layer is silkscreened directly onto the glass. While this method may avoid some of the problems associated with pasting paper-backed stencils onto glass substrates and the problems associated with the use of clamps, this method creates additional problems which make the overall process unattractive for efficient production of decorated glass articles. For example, a liquid adhesive needs to be applied to the glass surface to assure adequate bonding of the resist layer to the glass. Thus, effective use of this process requires an additional adhesive application step to complete the process. In addition, one cannot utilize a separate design decal for later use or for easy shipping to another location for the sandblasting process because the design is silkscreened directly onto the glass. Also, both the silkscreening process and the sandblasting process require the handling of the glass. Each time the glass is handled, the probability of glass breakage increases.

Since the date that U.S. Pat. No. 174,167 issued, to the present time, no one has been able to provide a simple and effective method and article for enabling the sandblasting of precise and intricate designs on glass surfaces. The particular problems associated with the art since the issue of U.S. Pat. No. 174,167, over one hundred and ten years ago, demonstrates the longfelt need for improvements to overcome the above-mentioned problems. The failure of others to develop and make effective use of a self-adhesive, paper-backed stencil for sandblasting and the eventual abandonment of a paper backing in favor of direct silk-screening onto the glass substrate, illustrates that there is no obvious solution available to solve these problems of longfelt duration.

Therefore, there remains a need in the art for providing a convenient and easy to use self-adhesive stencil for sandblasting designs on glass surfaces and which avoids the heretofore mentioned problems associated with the prior art.

SUMMARY OF THE INVENTION

This invention provides a method for sandblasting a decorative design onto glass and similar substrates and an article which is useful for carrying out this method. The article comprises a glue-based paper stock upon which is applied a design of resist material. The resist material is one which is capable of resisting the forces of conventional sandblasting processes currently used for producing designs on glass. The design of resist material is applied to the glue-based paper stock by any suitable means, especially by conventional silkscreen processes.

It is also possible to apply the resist material to the paper by hand.

The unique features of this invention are achieved by the use of a particular type of glue-based paper which allows the use of a paper-backed stencil without the disadvantages observed in the prior art. The particular glued-based paper can be easily adhered to the glass without the additional step of applying a separate adhesive to the glass itself. Furthermore, it has now been discovered that the use of the particular glue-based paper used in this invention offers a distinct advantage in sandblasting techniques because adequate adhesiveness is achieved with a minimum of glue and the glue is in a form which does not interfere with the sandblasting process. This type of advantage is of critical importance because any interference from the glue would seriously interfere with the glass erosion taking place after the exposed portions of the paper have been destroyed by the sandblasting. Such an interference with the erosion results in an inferior design on the glass due to loss of contrast and definition during the sandblasting operation.

It has presently been discovered that paper which has been coated with an adhesive in accordance with U.S. Pat. No. 3,425,968, the specification of which is incorporated herein by reference, provides the advantages spoken of when used to form a sandblasting stencil.

U.S. Pat. No. 3,425,968 relates to a particular type of gum coating for paper which is used to prevent unwanted curling of the paper which would occur if the paper were exposed to moisture. There is no suggestion of using this paper in combination with a resist coating to produce a self-adhesive stencil which is easily applied to glass and which would not interfere with the sandblasting procedure.

The form of the adhesive which has been found to be particularly useful in the sandblasting operation of this invention is described in U.S. Pat. No. 3,425,968. This patent discloses an adhesive coating of discrete gum particles which have attached themselves to a paper substrate and to each other at points of contact by reason of their own adhesive properties. Substantial amounts of binding resin are not required because a coating of gum particles is formed which acts as its own binder while also exposing a large area of exposed gum for rapid and efficient activation upon wetting. Since substantial amounts of binding resin are not used to form the adhesive of this paper, the amount of adhesive required for adhering the paper to the glass is kept to a minimum and, as a result, the amount needed for adhesion does not interfere with the sandblasting procedure.

In operation, a stencil is made by silkscreening a design onto the non-adhesive side of a sheet of self-adhesive glue based paper and then the stencil is adhered onto a glass substrate by simply wetting the adhesive side of the sheet and contacting it with the glass. The glass-stencil assembly formed by this operation is allowed to dry and is then sandblasted to erode the glass which underlies the portion of the stencil which is not protected by the resist material. The stencil and method avoids the necessity of applying paste to the glass and also avoids the cumbersome use of clamps and the like to keep the stencil and paper attached to the glass. The stencils are easy to handle and require only a thin layer of adhesive to achieve adequate bonding to the glass. Also, the stencils can be made in advance and shipped to remote areas for application to the glass and sandblasting. This last benefit is particularly desirable in the case of large glass panels where, for reasons of economics, are sandblasted in one location and the stencils are more easily manufactured in another location. Once the stencils have been made, they can be used by non-skilled operators to effectively etch highly decorative patterns on glass.

It is an object of the present invention to provide a stencil having a water-activated glue adhesive thereon which allows the stencil to be adhered to a glass substrate by simply wetting the glue.

It is a further object to provide a sandblasting stencil having a wter-activatable glue thereon which will not interfere with the sandblasting procedure.

It is a further object to provide a sandblasting stencil which can be easily removed from the glass when the sandblasting is over.

It is a further object to provide a stencil for sandblasting a design having good contrast and definition.

It is a further object of this invention to provide a process for sandblasting a design onto glass or a similar substrate which is simple and which minimizes manual operator steps.

It is a further object to provide a process for sandblasting a design onto glass which utilizes an improved stencil for that purpose.

These and other objects will become apparent to those who are skilled in the art.

DETAILED DESCRIPTION OF THE INVENTION

Figure 1:
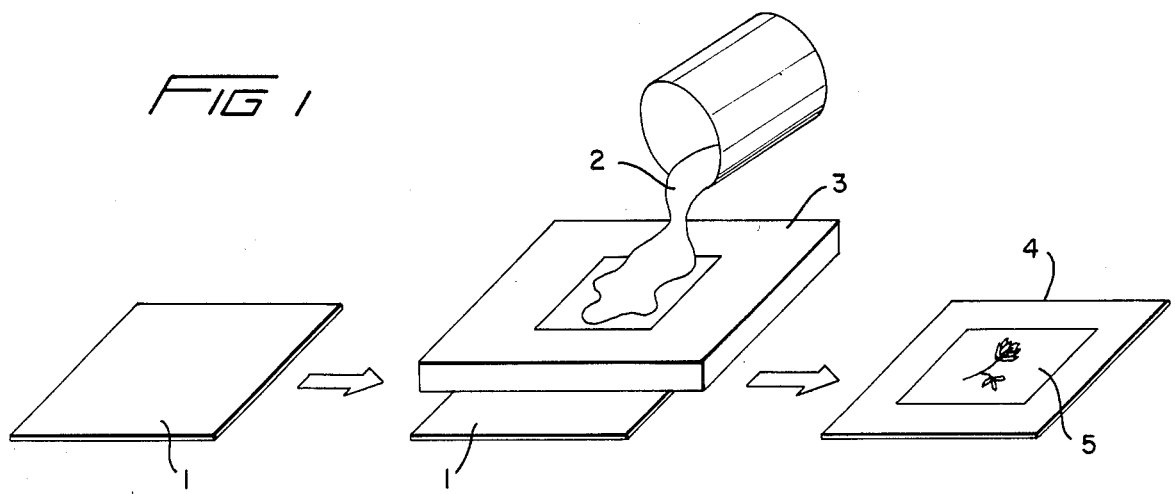
FIG. 1 is a schematic illustration which illustrates the formation of the stencils used in this invention.

The stencils of this invention are made by silk-screening a sandblast resist design onto a self-adhesive glue-based paper which utilizes a particular type of a water soluble adhesive layer.

The adhesive layer is a layer of discrete and individual gum particles which are attached to the sheet and to each other at their points of contact due to their own adhesive properties. The details of providing such an adhesive layer are fully described in U.S. Pat. No. 3,425,968.

U.S. Pat. No. 3,425,968 describes an improved gum layer suitable for adhesive paper which is activated by wetting. Included in this category are stamps, labels, envelopes and tapes. The present invention uses the above-mentioned category of water activatable adhesive paper in a stencil and process for sandblasting designs on glass.

In accordance with the method described in U.S. Pat. No. 3,425,968, individual particles of an aqueous gum solution are deposited onto a sheet of paper in such a manner that the gum particles adhere to the sheet by reason of the natural adhesive property of the gum and yet the particles of gum solution are not so diluted with water that they lose their finely divided form.

The particles of aqueous gum solution are deposited onto the sheet from a stable suspension. The suspension is formed by utilizing a high molecular weight water insoluble resin or polymer to form a stable dispersion of liquid soluble gum in an organic liquid. The suspension produced is a dispersion of preferably microscopically sized globules of liquid gum in a water-in-oil suspension wherein the continuous phase is a water insoluble resin or polymer dissolved in a solvent. The resulting dispersion may be sprayed, wiped, dipped, or otherwise conventionally coated upon sheets of paper and the water and the organic solvent then driven off. The product formed includes a relatively oil impermeable layer of discrete and individual gum particles which have attached themselves to the backing material and to each other at points of contact by reason of their own adhesive properties. The resin and glue form two separate phases which together co-operate to form a relatively nonporous layer. Due to the relatively low concentration of resin in the solvent, it is believed that a substantial portion of the resin is absorbed into the paper so that the glue particles in the layer appear as discrete solid particles touching each other tangentially, and the layer is free of substantial amounts of resin. This provides a large exposed gum surface area for quick activation.

In a preferred embodiment of the present invention, the stencil has an adhesive coating which is deposited from a dispersion of finely divided water soluble gum particles in a water solvent mixture. In this embodiment, the dispersion is obtained as follows:

(i) the water soluble adhesive component is added to the water miscible and/or immiscible organic solvent and heated to not less than approximately 100° F. and preferably up to slightly less than the vaporization temperature of the organic liquid used, or slightly less than the decomposition temperature of the gum. The mixture is then agitated briskly. The mixing and heating may be carried out in an open-topped steam kettle.

(ii) Water is added while heating and agitation is continued.

(iii) A quantity of water insoluble organic resin is added to the solution of gum, and continuous agitation as well as continued heating is carried out until a temperature is reached which is slightly below the decomposition temperature of the gum or the resin whichever is lower, or below the vaporization temperature of the organic liquid whichever is lower. It is maintained at this temperature for approximately between twenty and sixty minutes. The consistency and appearance of the dispersion at this point is that of a creamy or milky liquid depending upon the presence of any additives in the gum and upon its pigmentation.

(iv) A quantity of organic solvent at room temperature is added to dilute the heated mixture produced by steps (i) through (iii). Such solvent may be the same solvent as that added in step (i) or may be another organic solvent. The appearance and consistency of the mixture at this point resembles a colloidal suspension or a finely divided dispersion of gum particles in the liquid medium.

(v) The product composition is then coated onto a sheet of paper and the coated sheet is heated in order to remove the water and solvents from the gum layer and the coated base.

In another preferred embodiment the dispersion is formed as follows:

(a) the water soluble adhesive component, the water insolulable organic resin, the water miscible and/or immiscible organic solvent and water, if necessary, are brought together and the mixture is heated to not less than 100° F. and preferably to slightly less than the vaporization temperature of the organic liquid used or slightly less than the decomposition temperature of the gum or of the resin, and to whichever of these temperatures is the lowest. The mixture is agitated briskly, but not sufficiently to entrail air in the liquid mixture. The mixing and heating may be carried out in a steam kettle.

(b) Water may, if necessary, be added while heating and agitation is continued.

(c) The mixture is then heated and continuously agitated at the temperature described in step (a) for approximately twenty to sixty minutes. It will be obvious that additional water, solvent, insoluble organic resin, and gum may be added in order to alter the consistency of the mixture during the period that the mixture is heated and agitated. During the period of heating and agitation, and preferably at the beginning of the heating and agitation, a quantity of an electrolyte is added to the heated gum water and resin composition. The amount of electrolyte used is dependent upon the type of gum, the properties of the finished product, and the like. In flat gum paper formulations where the gum is to be activated by licking with the tongue, an odorless material which may be used for the gum of the extracted bone glue type is citric, salicylic or tartaric acid. The consistency and appearance of the dispersion at this point is that of a creamy or milky liquid depending upon the additives in the gum and upon its pigmentation.

(d) A quantity of organic solvent at room temperature is added to dilute the heated mixture produced by steps (a) through (c). Such solvent may be the same solvent as that added in step (a) or may be another organic solvent. The appearance and consistency of the mixture at this point appears to be a cooloidal suspension or a finely divided dispersion of gum particles in the liquid medium.

(e) The product composition is then coated on a sheet of paper and the coated sheet is heated in order to remove the water and solvents from the gum layer.

In the practice of this invention, it is preferred that the adhesive component be one such as dextrin which has high adhesive to glass. Thus, in a preferred embodiment of this invention, a stencil is made from a paper sheet which has the adhesive coating made in accordance with example 2 of U.S. Pat. No. 3,425,968.

The adhesive coating of the paper used in the stencils of this invention may be further treated to remove the water insoluble polymeric material therefrom. Thus, in a preferred embodiment of this invention, the adhesive layer on the paper is rinsed off with an organic solvent which leaves on the paper a coating which includes a multiplicity of solidified gum globules joined to each other tangentially and to the paper sheet.

The adhesive may be applied to any type of paper of the type which is currently used as a stencil backing for sandblasting designs on glass. The paper should be pulverizable so that the portion of the stencil which is not covered by the resist coating, will be pulverized during the sandblasting process. For that reason, uncoated paper stock is preferred as a paper upon which the adhesive is coated. A particularly suitable paper which already has the preferred adhesive coating thereon is a dry gum adhesive coated label paper sold by Brown-Bridge under the trademark "PANCAKE". Brown-Bridge is a division of Kimberly-Clark. It is preferred to use the "PANCAKE" paper which has no coating other than the adhesive coating. A particularly preferred paper is "PANCAKE" No. 47 which contains a dextrin adhesive.

The resist material is applied to the paper to produce a design thereon, by any conventional process such as silkscreening. Suitable machines for carrying out the silkscreening process include the "CAMEO" 18, 24R, 24SS built by American Screen Printing Equipment Company.

The resist material may be a vinyl plastisol composition such as the polyvinylchloride plastisol composition disclosed in U.S. Pat. No. 3,473,941, the specification of which is incorporated herein by reference. U.S. Pat. No. 3,473,941 discloses a polyvinyl chloride plastisol sandblasting resist material which is silkscreened onto a substrate before sandblasting. Similarly, the polyvinyl chloride-plastisol ink disclosed in U.S. Pat. No. 3,267,621, the specification of which is incorporated herein by reference, is suitable for use in the present invention. A mixture of plastisol and vinyl ink is suitable for this invention and the range of plastisol may be from 10-90%, by weight, and the range of vinyl ink may be 90-10%, by weight. Also suitable are the vinyl-plastisol compositions which are commercially available and currently used for making decals of a type which are used for transferring an artistic design or the like onto a T-shirt.

FIG. 1 illustrates the process for forming a stencil from a self-adhesive glue based paper stock. In accordance with the illustration of FIG. 1, a glue based paper stock 1 such as "PANCAKE" 47 green paper is coated with a vinyl plastisol ink 2 by means of a silkscreen 3. The vinyl plastisol ink design produced by the silkscreening process is cured to produce stencil 4 having an ink resist design coating 5 adhered thereon. The vinyl plastisol ink should be at least about 4 mils thick. The resist may be slightly thicker, but it is preferred to keep it close to 4 mils for good resolution.

Figure 2:
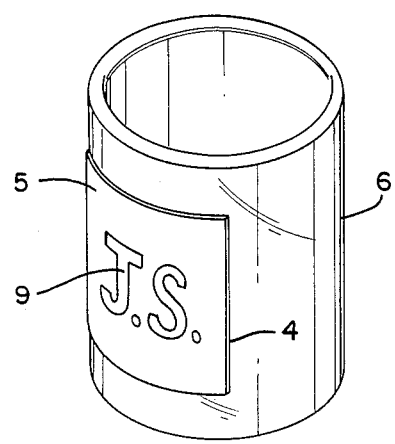
FIG. 2 illustrates a glass article having a stencil adhered thereto.

FIG. 2 illustrates a drinking glass 6 having stencil 4 adhered to it. The stencil is adhered to the glass by simply moistening the adhesive side of the stencil with water to activate the remoistenable adhesive. The glass-stencil assembly is allowed to dry and is then subjected to sandblasting. The stencil shown in FIG. 2 shows the resist layer 5 covering all of the stencil with the exception of the exposed area 9 which is in the form of the initials J.S.

Figure 3:
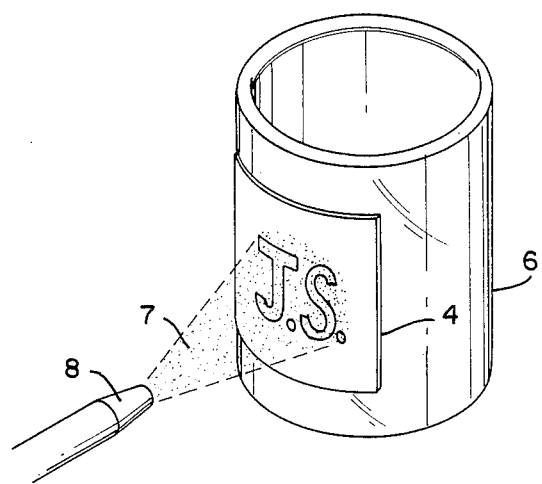
FIG. 3 illustrates the process of sandblasting a glass article having the stencil adhered thereto.

FIG. 3 illustrates a sanblasting procedure wherein a blast of abrasive grit 7 is directed from an orifice 8 toward the stencil 4. Conventional sandblasting, such as the sandblasting described in U.S. Pat. No. 3,267,621, is suitable for this invention. Various types of abrasive grit such aluminum oxide, corundum and carborundum are suitable. A preferred sandblasting method uses No. 100 aluminum oxide grit or finer at a psi of 40. Sandblasting is carried out using a constant psi of about 40-80 so that the paper deteriorates and allows the glass to erode underneath. Sandblasting is carried out until the glass has become eroded and takes on a frosted appearance. The sandblasting may be carried out for longer period of time to produce a deeper "cut" into the glass for various artistic effects.

Figure 4:
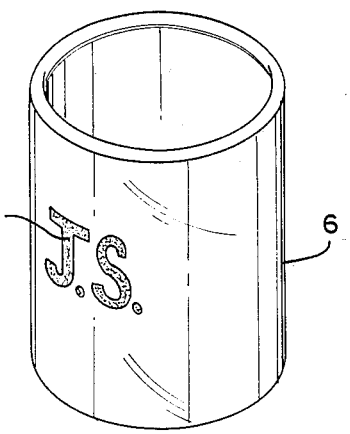
FIG. 4 illustrates a sandblasted glass after the stencil has been removed therefrom.

When the sandblasting is complete, the stencil is removed from the glass by washing it off with hot water. If necessary, light buffing may be used to assist in its removal. FIG. 4 shows the finished glass with the stencil removed and the design 11 produced by the erosion of the glass.

The following Example is given to illustrate a preferred embodiment of the invention.

EXAMPLE 1

A stencil is prepared by silkscreening a vinyl plastisol design onto a sheet of "PANCAKE" 47 dry gum labelled paper purchased from Brown-Bridge. In making the silkscreen, the screen film is first exposed, adhered and dried before using for the silkscreening process. The screening press is set up to produce a resist layer having a thickness of 4 mils. After screening the resist onto the paper stock, it is cured by heating the surface up to 320° F. until it is cured which is indicated when it is dry. Next, the adhesive side of the stencil is wet with water and adhered to a drinking glass. The stencil is allowed to dry. After the stencil is dry, it is sandblasted with No. 100 aluminum oxide grit at a constant pressure of 40 psi. The sandblasting proceeds until the exposed paper is pulverized and the underlying glass is eroded to result in a design thereon. The stencil is then removed from the glass by subjecting it to hot water whereby the water soluble adhesive is sufficiently dissolved to release the stencil.

While the present invention has been described in terms of certain preferred embodiments and exemplified with respect thereto, one skilled in the art will readily appreciate that various modifications, changes, omissions and substitutions may be made without departing from the spirit thereof. It is intended, therefore, that the present invention be limited solely by the scope of the following claims.

I claim:

1. A self-adhesive stencil for a sandblasting operation which comprises a paper sheet having an adhesive coating on one side and a coating of sandblast resist material on the other side; said resist coating being discontinuous whereby selected sections of the paper are uncoated to form a pattern on the paper; and said adhesive coating is a layer containing a multitude of selfbinding water activatable adhesive gum particles which are attached to the sheet and to each other at their points of contact.

2. The stencil of claim 1, wherein the gum is dextrine.

3. The stencil of claim 1, wherein the resist coating is a polyvinylchloride plastisol ink.

4. The stencil of claim 3, wherein the ink coating is at least 4 mils thick.

5. The stencil of claim 4, wherein the ink coating is applied to the paper by silkscreening.

6. The stencil of claim 5 wherein the gum is dextrine.

7. The stencil of claim 1, wherein the adhesive layer is deposited onto the paper from a suspension containing suspended globules of an aqueous gum solution in a continuous phase of water insoluble resin dissolved in an organic solvent whereby the deposited adhesive layer contains a multitude of discrete gum particles adhered to the paper sheet and to each other at their points of contact.

8. A stencil for a sandblasting operation which compises a polyvinyl plastisol resist pattern adhered to one side of a sheet of dry gummed adhesive paper; said paper having an adhesive layer on one side opposite to the side containing the resist layer.

9. A method of making a stencil which comprises depositing a sandblast resist layer of polyvinyl plastisol in the form of a pattern onto one side of a water activatable self-adhesive gum coated paper wherein one side of the paper is coated with the resist layer and the other side is coated with the adhesive gum coating and said gum coating is a layer containing a multitude of discrete gum particles adhered to the paper and to each other at their points of contact.

10. A method of sandblasting a pattern or design on the surface of a hard material which comprises adhering a self-adhesive stencil onto the surface; sandblasting the stencil while it is adhered to the surface and then removing the stencil from the surface; said stencil comprising a paper sheet having a sandblast resist layer on one side and a water activatable adhesive layer on the other side; said adhesive layer containing a multitude of discrete particles which are attached to the paper and to each other at their points of contact.

11. The method of claim 10, wherein the surface is glass.

12. The method of claim 11, wherein the resist layer is a polyvinyl plastisol layer.

13. The method of claim 12, wherein the polyvinyl layer is at least 4 mils thick.

14. The method of claim 13, wherein the stencil comprises a polyvinyl plastisol resist pattern on a sheet of dry gummed label paper.

* * * * *